C. GRAY.
ATTACHMENT FOR COOKING UTENSILS.
APPLICATION FILED SEPT. 20, 1912.
1,065,867.
Patented June 24, 1913.
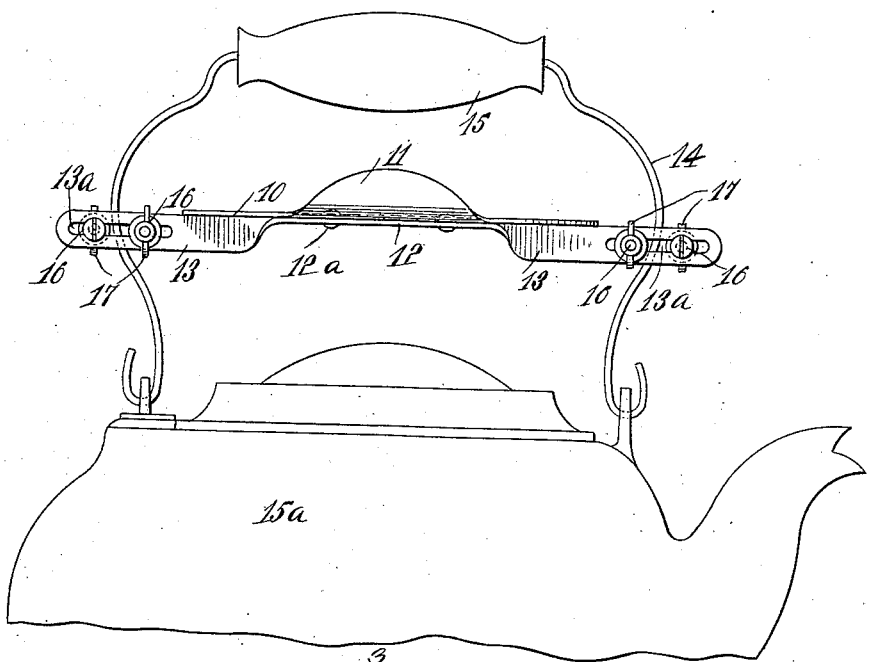
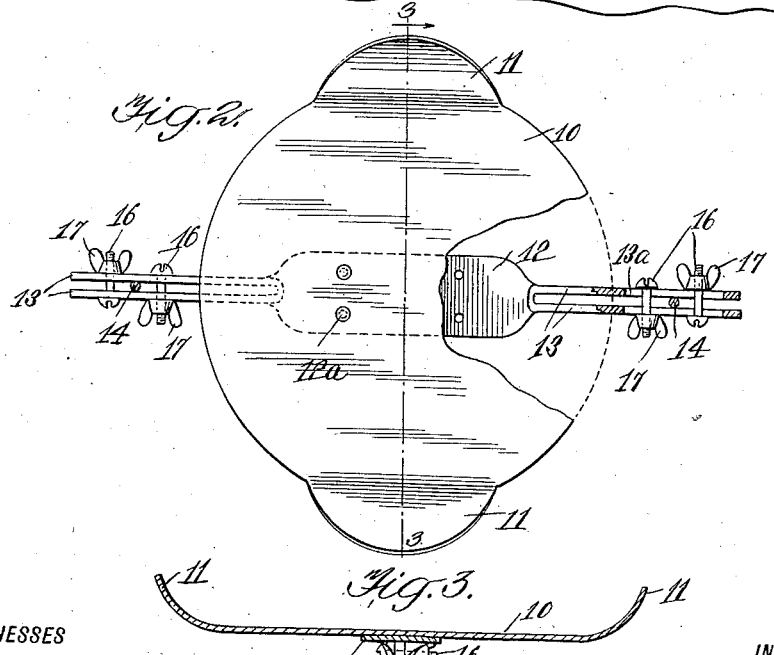
WITNESSES
INVENTOR
Charles Gray
BY Munn Co.
ATTORNEYS

UNITED STATES PATENT OFFICE.

CHARLES GRAY, OF NORTH TARRYTOWN, NEW YORK.

ATTACHMENT FOR COOKING UTENSILS.

1,065,867. Specification of Letters Patent. Patented June 24, 1913.

Application filed September 20, 1912. Serial No. 721,368.

*To all whom it may concern:*

Be it known that I, CHARLES GRAY, a subject of the King of Great Britain, at present residing in North Tarrytown, in the county of Westchester and State of New York, have invented a new and Improved Attachment for Cooking Utensils, of which the following is a full, clear, and exact description.

My invention relates particularly to attachments for kettles, pots and the like, provided with bails, and an object of the invention is to provide a guard or shield attachable to the bail of any utensil of the indicated character, to constitute a shield to prevent steam from rising around the handle of the utensil when the cover of the utensil is removed.

A further object of the invention is to provide a device of the indicated character capable of adjustment to suit bails within the capacity of the device.

The invention will be particularly explained in the specific description hereinafter to be given.

Reference is to be had to the accompanying drawings forming a part of this specification, in which similar characters of reference indicate corresponding parts in all the views.

Figure 1 is a side elevation of my improved attachment applied to the bail of a kettle; Fig. 2 is a plan view of the attachment, the bail being in section; and Fig. 3 is a transverse section on line 3—3 of Fig. 2.

In forming my improved device a shield 10 is provided, of plate metal, and desirably having its opposite edge portions up-turned, as at 11, and secured to the shield is an element 12, preferably in the form of a bar forked at opposite ends to provide pairs of arms 13 spaced apart to receive between them the bail 14 carrying the handle 15 of the kettle 15ª. The shield 10 is of sufficient area to prevent steam rising from the kettle around the handle 15. The pairs of arms 13 are at right angles to a line passing through the upturned edge portions 11, and they are formed with alining slots 13ª, through which clamp bolts 16 pass, provided with wing nuts 17. The bolts extend from opposite sides of the pair of arms so that the wing nuts 17 are at opposite sides of the arms and are also on opposite sides of the bail 14, for convenience in manipulating the arms to clamp them tightly against the said bail.

It will be observed that the bolts and their nuts may be moved toward and from each other to accommodate bails of different sizes within the capacity of the attachment in use on a kettle or other utensil, the turned ends 11 of the shield coming in contact with the top of the utensil when the bail is permitted to fall to either side and thus, when the bail is lowered, its downward movement is limited so that no portion of the shield will dip into the contents of the vessel, the contact of the ends 11 with the vessel limiting the downward movement of the shield and bail, at the same time the shield will prevent the steam from contacting with the hand of the person handling the utensil.

Having thus described my invention, I claim as new, and desire to secure by Letters Patent:—

1. An attachment for cooking utensils, having bails, comprising a shield presenting an approximately horizontal area sufficient to form a barrier to steam rising from the utensil, pairs of arms projecting from opposite sides of the shield, and clamping means carried by said arms to clamp the same to the bail of the utensil, said clamping means consisting of a pair of spaced bolts passing through each pair of arms and provided with nuts, the nuts of each pair of bolts being disposed on opposite sides of the said arms.

2. An attachment for cooking utensils having bails, comprising a shield in the form of a plate having turned-up edge members at two opposite points, a member secured to said plate and formed with forked ends presenting pairs of spaced arms extending in a line at about right angles to the up-turned edge members, said arms having alined slots, and a pair of clamp bolts passing through the slots of each pair of arms, the bolts of each pair of arms extending in opposite directions and provided with wing nuts at opposite sides of the pairs of arms.

In testimony whereof I have signed my name to this specification in the presence of two subscribing witnesses.

CHARLES GRAY.

Witnesses:
WALTER CASTNER,
HARRY GRAY.

Copies of this patent may be obtained for five cents each, by addressing the "Commissioner of Patents, Washington, D. C."